United States Patent Office 3,449,455
Patented June 10, 1969

3,449,455
SIDE CHAIN ALKYLATION
John P. Napolitano, Royal Oak, Mich., and Rex D. Closson, Mattoon, Ill., assignors to Ethyl Corporation, New York, N.Y., a corporation of Virginia
No Drawing. Filed Oct. 10, 1967, Ser. No. 674,109
Int. Cl. C07c 3/52
U.S. Cl. 260—668          12 Claims

ABSTRACT OF THE DISCLOSURE

When dispersed on diatomaceous earth, sodium and potassium catalyze alkylation of carbon atoms alpha to a benzene nucleus. For example, these catalysts are useful when preparing isobutylbenzene from toluene and propylene, and n-propylbenzene from toluene and ethylene. No catalyst promoter is required. Pretreatment of the diatomaceous earth (20° C.–120° C., 1–10 mm. Hg for 2–24 hours) markedly improves the yield.

Background of the invention

Alkylation of aromatic systems has been studied for a long time. First, prior workers discovered that sulfuric acid, hydrogen fluoride, and Friedel-Crafts catalysts promoted alkylation of aromatic ring-carbon atoms. Later it was discovered that alkali metals catalyze alkylation of hydrogen-bearing carbons alpha to the benzene nucleus.

Whitman reported the use of alkali metals in 1948, U.S. 2,448,641. That patent teaches reaction temperatures of 150° to 450° C. and reaction pressures of 50 to 3000 atmospheres. Example III teaches a preparation of n-propylbenzene from toluene and ethylene. The example reports that a conversion of 26 percent and a yield of 57 percent was obtained when the reaction was conducted in a hot tube—at 225° C. and at 250 atmospheres—for ten hours.

Pines also studied side chain alkylation of aromatics catalyzed by alkali metals; J. Am. Chem. Soc. 77, 554 (1955). In Table III of that publication it is reported that only two percent of the toluene used was reacted when toluene was treated with ethylene at 325° C. in the presence of sodium.

Pines found that the reaction yield was enhanced if the sodium catalyst was promoted with such substances as anthracene, fluorene, dehydroanthracene, o-chlorotoluene, o-bromotoluene, benzyl chloride, allyl chloride, s-butyl chloride, o-toluic acid, benzonitrile, pyridine, m-cresol, and di-tert-butyl peroxide. Related publications by Pines and his co-workers are the following: J. Am. Chem. Soc., 78, 4316 (1956) and J. Am. Chem. Soc., 78, 5946 (1956). (Patents to Pines on this work are cited by Shaw et al., infra.) In further regard to the alkali metals per se, Shaw et al. U.S. 3,006,976, discovered that improved yields were obtained when mixtures of alkali metals were employed as catalysts.

Little, U.S. 2,548,803, teaches that side chain alkylation can take place when organo-alkali metal catalysts are employed. Thus, Example I of the Little patent teaches preparation of n-propylbenzene from toluene and ethylene in the presence of a catalytic quantity of benzyl sodium. Example II teaches the same reaction using amyl sodium as a catalyst. Likewise, Example III teachees the same reaction wherein phenyl sodium is the catalyst. All these reactions require extended reaction periods and elevated pressures. Closson et al., U.S. 2,728,802, discovered a marked improvement. In their patent, Closson et al. teach that organo-alkali metal catalysts can be employed at lower pressures and shorter reaction times than called for by Little. Closson et al. also extended the reaction to the alkylation of nitrogen-containing heterocyclic amines, U.S. 2,750,384.

Foster, U.S. 3,160,670, teaches the alkylation of an aromatic hydrocarbon (having a saturated hydrogen-containing carbon atom adjacent to a benzenoic nucleus) using the graphite inclusion compound $KC_8$ as the catalyst.

Schapp, U.S. 2,995,610, teaches the alkylation of toluene with propylene in the presence of a solid particulate catalyst consisting of between about 10–35 percent by weight of sodium or potassium supported on active carbon. Warner, U.S. 3,291,847, discloses side chain alkylation in the presence of a catalyst comprising a major amount of sodium and/or potassium and a minor amount of graphite supported on soda ash.

This invention has advantages over prior art processes. With regard to the alkali metals per se this invention does not require the strenuous reaction conditions employed by Whitman. Also, the yields afforded by this process are higher than those obtained by Pines in his unpromoted system. Moreover, this invention does not require the use of Pines' promoters. Turning to the organo-alkali metal catalysts, this invention does not entail the use of the strenous reaction conditions required by the Little process.

As will be seen, at least a preferred embodiment of this invention affords higher yields of products than those supported by Schapp. It will be noted that this invention only requires two ingredients in the catalytic system, namely, an alkali metal and diatomaceous earth. In contrast, Warner, supra, uses three ingredients, viz., an alkali metal, graphite, and soda ash.

In many instances, the products produced by the process of this invention are old compounds, and they have the utilities known for them. For example, the liquid materials can be used as solvents. Moreover, many of the compounds have excellent octane qualities, and they can be used as gasoline blending stocks. In addition, products of this invention can be used as rejuvenants for Group VIII metal catalysts employed in isomerizing alpha to beta olefins. Similarly, products of this invention can be used as coolants as taught in Hengstebeck, U.S. 2,493,917. The products are also useful as chemical intermediates.

Summary of the invention

The heart of this invention resides in the discovery that sodium and potassium, when dispersed on diatomaceous earth, are efficacious catalysts for producing compounds via side chain alkylation. A highly preferred embodiment resides in the discovery that pretreatment of the diatomaceous earth results in a markedly improved yield.

There are some aspects of the preferred embodiment which can be considered before discussing this invention in detail. First, the preferred embodiment comprises treating the catalyst under vacuum and preferably at an elevated temperature. Although the change this treatment causes is not known, it would seem at first blush that the treatment entails removal of volatile materials from the diatomaceous earth. In this regard, page 56 of Kirk-Othmer's Encyclopedia of Chemical Technology, 2nd ed., Interscience Publishers, New York, points out that diatomaceous earth will exhibit loss on ignition. However, the temperatures employed in this pretreatment step are far below common ignition temperatures.

Moreover, it is easy to speculate that the pretreatment step results in water loss and this enhances the catalytic activity. However, experimental results indicate that this is not the case. More specifically, preparations of isobutylbenzene were made using potassium on diatomaceous earth which had been pretreated. In these instances, the diatomaceous earth had a water content no greater than 0.75 percent. (Diatomaceous earth with this water content was found during the development of this invention to be satisfactory.) In these preparation, the yields were in the range of 60–66 percent.

Other similar runs were made using diatomaceous earth which had not been pretreated but which had a very low water content (0.09–0.19 percent). If the removal of water was all that was required, the product yields would be expected to go up. However, it was found that the yields produced by drier diatomaceous earth were lower (33–46 percent).

Furthermore, it might be thought that the pretreatmen step removed adsorbed $CO_2$ and such $CO_2$ was deleterious. However, Warner, supra, uses much $Na_2CO_3$ as a support and achieves good yields. For this reason, it would be thought that $CO_2$ on the diatomite would enhance the reaction since it would react with dispersed potassium to form $K_2CO_3$. Yet, it was found that diatomite which had not been pretreated—and therefore not subjected to conditions which could remove $CO_2$—gave inferior results.

Description of preferred embodiments

The process of this invention comprises a method for the alkylation of a hydrogen-bearing carbon atom adjacent to an aromatic nucleus. The agent which contributes to the resultant alkyl group is an olefin. A wide variety of olefins and aromatic compounds can be employed in the process. Of these it is preferred to use reactants which are stable, unhindered and active.

A reactant is stable if it does not decompose by an extraneous side or competitive reaction under he reaction conditions employed, and if the product is stable under said conditions to a significant extent. Reactants are unhindered when they are free of bulky substituents that unduly retard the process by steric hindrance. Active starting materials are those which do not contain any substituents in such juxtaposition with the reactive sites as to cause an inability to form the desired product because of a perturbation of the electronic configuration of the reactive sites.

Of all the olefins meeting these criteria, olefins having up to four carbon atoms arep referred. It is also preferred that these olefins be solely composed of carbon and hydrogen. In order to obviate any possible extraneous side reaction the olefins should be free of acetylenic bonds. Preferred olefins are those which contain one olefinic linkage, such as ethylene, propylene, butene-1, and butene-2.

Of the aromatic compounds which can be used in this process, those which are more readily available are preferred. Of these, benzenoid aromatic compounds solely composed of hydrogen and up to 14 carbon atoms are more preferred. For best results, these compounds should have not more than two hydrogen-bearing carbon atoms alpha to the aromatic ring. Also, best results are achieved if the aromatic nucleus is free of aliphatic substituents containing unsaturated linkages. Compounds of this type fall into four major subclasses:

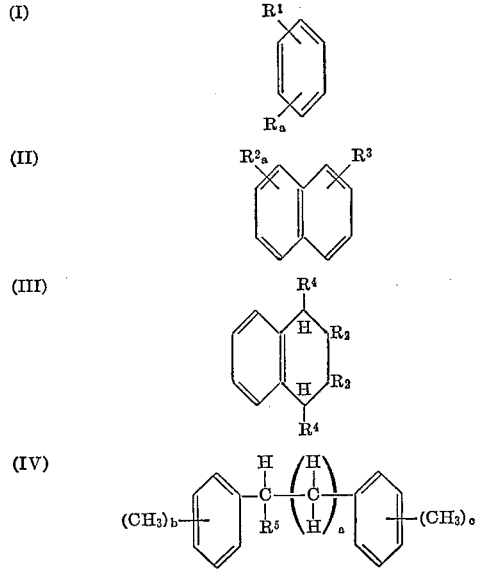

In Formula I, $R^1$ is an aliphatic radical selected from alkyl, cycloalkyl and alkylcycloalkyl radicals—having up to 8 carbon atoms—which are bonded to the benzene nucleus through a hydrogen-bearing carbon atom. In the same formula, R is an alkyl, cycloalkyl, or alkylcycloalkyl radical of up to 8 carbons. The subscript $a$ is equal to zero or 1 indicating that the presence or absence of the radical R is optional. When $a$ is equal to 1, R and $R^1$ are selected so that the maximum number of carbon atoms in the molecule is 14. With regard to the alkylcycloalkyl radicals they can be bonded to the aromatic nucleus through a carbon atom in the ring or a carbon atom in the alkyl chain.

In Formula II, $R^3$ is an alkyl radical having up to 4 carbon atoms which is bonded to the naphthylene nucleus through a hydrogen-bearing carbon atom. The radical $R^2$ is an alkyl radical of up to 4 carbon atoms. As above, $a$ is an interger having the value of zero or 1. When it is equal to one, $R^2$ and $R^3$ are chosen so the total number of carbons in the molecule is no greater than 14. When both radicals $R^2$ and $R^3$ are present, they can be bonded to carbon atoms in separate rings or in the same ring.

In Formula III, $R^4$ is hydrogen or an alkyl radical of 1–4 carbons.

In Formula IV, $a$ again is 0 or 1. The integers $b$ and $c$ have the same values. However, only one of $a$, $b$, and $c$ can have the value 1 at the same time; $R^5$=H or —$CH_3$.

Of these aromatic compounds the most preferred are toluene, xylene, ethylbenzene, n-propylbenzene, isopropylbenzene, mesitylene and 1,2,3,4-tetrahydronaphthalene.

The process of this invention can be illustrated by the formation of n-propylbenzene from toluene and ethylene and the preparation of 3-phenylpentane from propylbenzene and ethylene. These processes are illustrated by the equations below. In the equations [CAT] stands for sodium or potassium dispersed on diatomaceous earth.

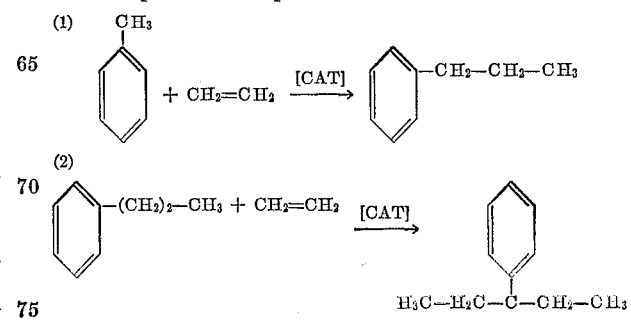

The processes illustrated by the above equations are preferred embodiments of this invention. The following are other preferred embodiments:

(a) Preparation of 3-ethyl-3-phenyl pentane from toluene, 1 mole, and ethylene, 5 moles; 1/32 mole of potassium on diatomaceous earth and 130° C.

(b) Preparation of sec-butylbenzene from ethylbenzene (1 mole) and ethylene (1 mole); 1/64 mole of potassium on diatomite and 130° C.

(c) Preparation of tert-amylbenzene from isopropylbenzene (1 mole) and ethylene (1.5 mole); 1/32 mole of potassium on diatomite at 130° C.

(d) Preparation of 1-ethyl-1,2,3,4-tetrahydronaphthalene from 1,2,3,4-tetrahydronaphthalene (1 mole) and ethylene (0.6 mole); 1/64 mole of potassium on diatomite and 100° C.

(e) Preparation of 1,4-diethyl-1,2,3,4-tetrahydronaphthalene from 1,2,3,4-tetrahydronaphthalene (1 mole) and ethylene (1.5 mole); 1/64 mole of potassium on diatomite and 130° C.

(f) Preparation of isobutylbenzene from toluene and propylene; see Examples XIV–XVI.

(g) Preparation of o-n-propyltoluene from o-xylene (1 mole) and ethylene (0.64 mole); 1/64 mole of potassium on diatomite and 130° C.

(h) Preparation of meta-n-propyltoluene from meta-xylene and ethylene (same relative amounts and reaction temperature as in (g) above).

(i) Preparation of p-n-propyltoluene from p-xylene and ethylene (same relative amounts and reaction temperature as in (g) above).

(j) Preparation of o-methyl-3-pentyl benzene and o-dipropyl benzene from o-xylene (1 mole) and ethylene (1.8 mole); 1/64 mole of potassium on diatomite and 130° C.

(k) Preparation of meta-methyl-3-pentylbenzene and m-dipropylbenzene from meta-xylene and ethylene (same relative amounts and reaction temperature as in (j) above).

(l) Preparation of p-methyl-3-pentylbenzene and p-dipropylbenzene from p-xylene and ethylene (same relative amounts and reaction temperature as in (j) above).

(m) Preparation of o-n-propyl-3-pentylbenzene from o-xylene (1 mole) and ethylene (5 moles); 1/32 mole of potassium on diatomite and 130° C.

(n) Preparation of meta - n - propyl - 3 - pentylbenzene from meta-xylene and ethylene (same relative amounts and reaction temperature as in (m) above).

(o) Preparation of p-n-propyl-3-pentylbenzene from p-xylene and ethylene (same relative amounts and reaction temperature as in (m) above).

(p) Preparation of 1,1,4 - triethyl - 1,2,3,4 - tetrahydronaphthalene from 1,2,3,4-tetrahydronaphthalene and ethylene (same relative amounts and reaction temperature as in (m) above).

(q) Preparation of 1-propyl-3,5-dimethylbenzene from mesitylene (1 mole) and ethylene (0.6 mole); 1/32 mole of potassium on diatomite and 130° C.

Entry (f) above indicates that the process described therein can be conducted according to examples reported below. Likewise, all the other processes described in (a)–(q) are conducted following the teachings of the working examples.

In summary, a highly preferred embodiment of this invention is a side chain alkylation process which comprises reacting a terminal olefin having up to four carbon atoms with an aromatic compound having the moiety

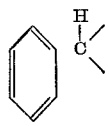

said aromatic compound selected from toluene, xylene, ethylbenzene, isopropylbenzene, mesitylene, n-propylbenzene, and tetralin, said process being conducted at a temperature of from about 100° to about 250° C., a pressure of from about 14.7 to about 400 p.s.i.g., and in the presence of a catalytic quantity of potassium metal dispersed on diatomaceous earth. A most preferred embodiment of this invention comprises conducting the above process with a catalyst consisting essentially of potassium on diatomaceous earth, said diatomaceous earth being treated—before dispersal thereon—at 20° to 120° C. and 1 to 10 mm. Hg for 2–24 hours.

The diatomaceous earth within the catalysts of this invention is the diatomite of commerce. Such material is adequately described in Kirk-Othmer, volume 7, supra, pages 53–63; Celite, The Story of Diatomite, published by Johns-Manville Corporation and copywrited in 1953, and the brochure Johns-Manville, Celite for Chemically Inert Catalyst Carriers. The disclosure within these three publications cited above are incorporated by reference herein as if fully set forth.

A wide variety of grades of commercial diatomites can be employed to prepare the catalysts of this invention. Thus, grades of diatomite sold as catalyst carriers can be employed. These can be in many physical forms such as powders, granules, pellets and extrudates. Likewise, good results are obtained when diatomite grades prepared especially for filtration are used in preparing the catalysts. In fact, a preferred type of diatomite for this invention is Hyflo Super-Cel, a filtration grade diatomite sold by Johns-Manville Corporation.

The catalyst can be prepared by using the diatomite as received from the manufacturer. However, as already referred to above, it is preferred that the diatomite be pretreated prior to dispersal of the alkali metal thereon.

Various forms of sodium and potassium such as chunks and wire can be used in the preparation of the catalyst. Preferably, the alkali metal is not substantially coated with an oxide. Best results are achieved as the alkali metal is free of the oil under which it is normally stored. The residue of oil can be removed by washing the alkali metal with sufficient quantities of the aromatic material to be reacted in the process. For example, if the alkali metal is going to be used to catalyze the reaction of toluene with an olefin, a convenient method for removing the oil residue is to pre-wash the alkali metal with toluene.

The catalysts of this invention are prepared by methods which are simple and readily carried out. One method comprises adding the desired amounts of alkali metal and diatomite to a reaction vessel under nitrogen and then heating the mixture above the melting point of the alkali metal with stirring. A second method comprises an in situ formation of catalyst. When this method is conducted the reaction vessel is charged with a desired quantity of aromatic hydrocarbon, alkali metal and diatomaceous earth, and then the mixture is heated for about one or two hours above the melting point of the alkali metal. (After this, the vessel is charged with olefin and the alkylation reaction conducted.) This second process for catalyst preparation is also best carried out under nitrogen or a similar inert atmosphere.

The relative amounts of the alkali metal and diatomaceous earth are not critical. It is only necessary to disperse a catalytic quantity of alkali metal on a suitable quantity of diatomite. Good results are achieved when from about 0.5 to about 4.8 grams of alkali metal are dispersed on each 10 gram portion of diatomite. In many instances, potassium on diatomaceous earth gives better results than the corresponding sodium catalyst. For this reason, the potassium catalysts are preferred.

It is convenient to discuss the amount of catalyst in terms relative to the amount of aromatic hydrocarbon employed. In general, from about 0.1 to about 10 moles, and preferably 1–5 moles of alkali metal are employed per each 100 mole portion of aromatic hydrocarbon used. There is no real upper limit on the amount of catalyst. However, as comparatively large quantities of catalyst are employed the reaction may become uneconomical because of higher raw material costs or higher capital investment due to the need for equipment necessary to run an extremely rapid reaction. In addition, it has been found that when the amount of catalyst is increased (the other reaction conditions being unchanged) in many instances polysubstitution of aromatic groups is favored.

The relative amounts of aromatic hydrocarbon and olefin is not critical. However, the relative amounts of reactants has some bearing on the reaction product produced. In general, if it is desirable to alkylate only one hydrogen on an alpha carbon atom, less than one mole of olefin should be introduced into the reaction zone per each mole of aromatic hydrocarbon. Thus, when supplying less than stoichiometric amounts of the reactant used at 130°, the n-propylbenzene/3-phenylpentane ratio (produced by reacting toluene with ethylene) was about 4.0 whereas from 0.67 mole of ethylene was employed the ratio was about 7.5.

As indicated in the paragraph immediately above, it has been found that in many instances—where polysubstitution is possible—that a mixture of mono and poly alkylated products are obtained. As stated herein the ratio of products can be varied by changing the reaction temperature, the aromatic compound/olefin ratio and by varying the amount of alkali metal catalyst. With these in mind, a skilled practitioner without great experimentation can design a process to produce results optimum to that desired.

The process of this invention is readily carried out by contacting the reactants and the catalyst at a temperature which affords a reasonable rate of reaction. In general, temperatures within the range of 100° to about 200° C. are employed. A preferred temperature range is from about 130°–180° C. Besides being characterized by the moderate temperatures involved, this process is also advantageous because of the low pressures required. Pressures within the range of from about atmospheric to about 400 p.s.i.g. are applicable. A preferred pressure range is from about 75 to about 400 p.s.i.g.

The product(s) produced in a reaction according to this invention can be separated from the resultant reaction mixture by means known in the art. In this regard, vapor chromatography, adsorption and fractional distillation can be employed.

The following examples serve to illustrate this invention but not limit it. All parts are by weight unless otherwise stated.

Example I

The Hydro Super-Cel was placed in a 500 ml. round bottom flask which was immersed in an oil bath and heated for about 16 hours at 100°/1 mm.

The alkylation was carried out in an autoclave (1100 ml. capacity) which was equipped with baffles, a turbine stirrer (rotating at 600 r.p.m.) a thermowell and the necessary gas inlet lines.

To the autoclave was charged 26.9 grams of the dried Hyflo Super-Cel, 662 grams (7.18 moles) of toluene and 4.38 grams (0.1123 mole) of potassium metal. The mixture was heated and at near 100° the stirrer was started. The temperature was increased to 180° and held at this temperature for one hour. A pressure rise from 50 to 60 p.s.i.g. was observed during the 180° heating period. The reaction mixture was cooled to near 130° and the ethylene addition was started. The ethylene was added from a cylinder through a reducing valve which maintained a constant pressure as the ethylene was used. The initial ethylene charge (38 grams) gave an autoclave pressure near 350 p.s.i.g. Ethylene continued to add and a total of 135 grams was added to the autoclave over a 33 minute period. The ethylene in the autoclave continued to react until the autoclave pressure was reduced to 50 p.s.i.g. This required an additional 22 minutes. The total reaction time was 55 minutes.

The reaction mass was cooled to near 80° and the excess ethylene was vented. To the autoclave was added 51 grams of neutral 75 oil. The crude product was flash distilled up to 230°. There was obtained 762 grams of an almost water white liquid. The residue from the flash distillation (a wet solid) weighed 84 grams.

The crude product was distilled through a 3-foot helices packed column rated at 33 plates. There was recovered 250 grams of toluene (37.8 percent), 438 grams n-propylbenzene (50.7 percent conversion) and 72 grams of 3-phenylpentane (6.7 percent conversion). The toluene boiled at 109–110°, the n-propylbenzene at 157.5–159° and the 3-phenylpentane at 188–189°.

Examples II–XIII

Reaction particulars and results obtained for these examples are set forth in Table 1. The general procedure used in these examples is described immediately below.

The Hyflo Super-Cel was placed in a 500 ml. round bottom flask which had been brushflamed and flushed with nitrogen. The flask was immersed in an oil bath and heated for about 16 hours at 100°/1 mm.

The alkylation was carried out in an autoclave (1100 ml. capacity which was equipped with baffles, a turbine stirrer (rotating at 600 r.p.m.), a thermowell, a charge port and the necessary gas inlet lines.

The following general procedure was used in all of the ethylation of toluene experiments.

To the autoclave was charged the dried Hyflo Super-Cel, the toluene and the potassium metal. The mixture was heated and at near 100° the stirrer was started. The temperature was increased to 150° and held at this temperature for one hour. A pressure rise from 50 to 60 p.s.i.g. was observed during the 150° heating period. The reaction mixture was cooled to near 130° and the ethylene addition was started. The ethylene was added from a weighed cylinder through a pressure reducing valve which maintained a constant pressure as the ethylene was reacted. An initial ethylene charge gave the pressure at which the experiment would be conducted and additional ethylene was added at this pressure until the desired amount was used. The ethylene in the autoclave continued to react until the autoclave pressure was reduced to near 50 p.s.i.g.

The reaction mass was cooled and the unreacted ethylene was vented. In some of the experiments, samples were removed through the autoclave dipleg and the composition of the mixture was determined by gas chromatography. In others, Neutral 75 oil was added to the autoclave and the crude product was flash distilled.

The crude product was distilled through a 3 foot helices packed column rated at 33 plates. The toluene boiled at 109–110°, the n-propylbenzene at 157.5–159° and the 3-phenylpentane at 188–189°.

The amount of reactants used, the reaction conditions and the yields obtained are reported in Table 1.

In the following table, Experiments XI and XII were conducted using diatomite which had not been pretreated. As can be seen by the results in Example XI, this materially cuts down the yield. In Example XII a yield of 53 percent was obtained but about twice as much catalyst (compared to the other runs) was employed.

Aside from Examples XI and XII, all other examples described herein are conducted using pretreated diatomite except if otherwise noted.

TABLE 1

| Example No. | Reactants | | | | Reaction Conditions | | | Yields | | |
|---|---|---|---|---|---|---|---|---|---|---|
| | Toluene, moles | Ethylene, moles | Potassium, moles | Hyflo Super-Cel, grams | Time, min. | Temp., °C. | Pressure, p.s.i.g. | Toluene, percent recov. | n-propyl benzene, percent conv. | 3-phenyl pentane, percent conv. |
| II | 4.0 | 4.25 | 0.125 | 15 | 147 | 130–136 | 375–300 | 12.7 | 60.2 | [1] 21.0 |
| III | 4.0 | 4.00 | 0.125 | 15 | 131 | 130 | 355–300 | 21.8 | 48.4 | [1] 14.0 |
| IV | 4.0 | 4.45 | | | 235 | 130 | 390–340 | 19.9 | 62.5 | [1] 24.6 |
| V | 4.0 | 3.57 | | | 115 | 130 | 340 | 44.34 | 39.1 | [1] 15.9 |
| VI | 4.0 | 3.75 | 0.0625 | 15 | 180 | 131 | 350 | 23.4 | 56.8 | [1] 14.3 |
| VII | 4.0 | 3.40 | 0.0625 | 15 | 112 | 180 | 340–75 | 32.0 | 48.8 | 19.0 |
| VIII | 7.18 | 4.821 | 0.1123 | 26.9 | 55 | 130 | 350 | 37.8 | 50.7 | [1] 6.7 |
| IX | 7.18 | 4.821 | 0.1123 | 26.9 | 180 | 110–120 | 345 | 40.0 | 51.6 | 8.3 |
| X | 7.18 | 4.821 | 0.1123 | 26.9 | 80 | 130 | 200 | 36.9 | 52.6 | 10.5 |
| XI | 7.18 | 4.464 | 0.1123 | 26.9 | 120 | 130–180 | 365–350 | 39.1 | 43.0 | 15.0 |
| XII | 7.18 | 4.821 | 0.250 | 26.9 | 114 | 140–142 | 350 | 33 | 53.6 | 11.1 |
| XIII | 7.18 | 4.821 | 0.1123 | 26.9 | 67 | 130 | 350 | 30.4 | 56.6 | 10.9 |

[1] Yields were obtained by distillation of the product. In the other experiments, yield figures represent the area percent of components separated by gas chromatography.

Example XIV

To a dry 12-liter 3-neck flask, 1125 grams of Johns-Manville Hyflo Super-Cel were charged. The flask was left overnight under vacuum while heating the charged diatomite to 264° C. The next day a nitrogen atmosphere was placed in the flask and the Super-Cel cooled to 105° C. Under the nitrogen atmosphere, 366 grams of potassium metal were added to the diatomite. With stirring the potassium was dispersed on the diatomite at a temperature of 95° to 112° C. over a period of two hours and 25 minutes.

Thereafter, the potassium on diatomite was then slurried with toluene and transferred to a clean dry-nitrogen flushed 20-gallon autoclave. Additional toluene amounting to a total charge of 61 pounds was used to transfer the catalyst in batch-wise additions.

After all the toluene and catalyst had been charged to the autoclave it was sealed and heating was started. At a temperature of 71° C. propylene addition was started. At a temperature of 124° C. the pressure had risen to 285 p.s.i.g. At this point, 12 pounds of propylene had been added to the reaction vessel. At 180° C. the pressure was 480 p.s.i.g. Two hours were required to react enough propylene to reduce the pressure to 350 p.s.i.g. At that pressure, propylene addition was resumed and an additional 29 pounds 9 ounces of propylene were added over a period of five hours and eight minutes at a temperature of 173° to 184° C. During this addition period, the pressure was between 325 and 400 p.s.i.g. The reaction mixture was then cooled to 119° C. and left overnight.

The next morning the autoclave was vented to atmospheric pressure, then 22 pounds 12 ounces of Neutral No. 75 oil was added to the autoclave. The autoclave was then closed and heating was started for an atmospheric distillation. A total of 21 pounds 7 ounces of distillate was recovered. Later the distillation was completed under vacuum.

Analysis indicated that the yield of isobutylbenzene was 62.2 percent, the yield of n-butylbenzene 7.6 percent. The toluene recovered by the distillation amounted to 17.8 percent.

In a similar manner, butene-1 reacts with toluene at 250° C. to form isoamylbenzene and butene-2 reacts at the same temperature to form of the same product. In these preparations, pressure of 400 p.s.i.g. can be employed.

Example XV

To a dry 12 liter 3-neck flask was added 1125 grams of Hyflo Super-Cel. The Super-Cel was heated to 230° C. under 2 mm. Hg pressure and dried for a period of 30 minutes. The material was then cooled to about 120° C. and toluene was added to slurry the diatomite. The slurry was then charged to a clean dry nitrogen-flushed 20-gallon autoclave. The total toluene charged to the autoclave was 61 pounds 10 ounces. After the toluene slurry had been added to the autoclave 366 grams of potassium metal was charged and the vessel sealed overnight under nitrogen pressure.

The following day the nitrogen was vented and heating started. At 65° C. the stirrer was turned on and then heating was continued to 180° C. After a one-hour period at this temperature, propylene addition was initiated. A total of 36 pounds 11 ounces of propylene was added over a period of 4 hours and 35 minutes at a temperature of 175° to 183° C. and a pressure of 348 to 350 p.s.i.g. (with a brief excursion to 358 p.s.i.g.). The alkylation reaction was terminated when the take-up had dropped to one ounce in a five-minute period. The reaction mixture was then cooled and left under propylene pressure overnight.

The next day the autoclave was vented and 22 pounds 9 ounces of Neutral No. 75 oil were charged. The autoclave was set up for a vacuum distillation and heating started. Distillate was removed to an autoclave temperature of 178° C. at 29 inches of vacuum. A total of 86 pounds 7 ounces of distillate was obtained.

Analysis indicated that the yield of isobutylbenzene was 63.5 percent and the yield of n-butylbenzene 4.2 percent. The toluene recovered amounted to 18.9 percent.

Example XVI

In this example, four preparation of isobutylbenzene are summarized. In all the experiments herein reported, Johns-Manville Hyflo Super-Cel was used as the catalyst carrier. The Hyflo Super-Cel was dried in a 1-liter flask at 100° C. and at a pressure of 1 mm. Hg for two hours except for the first experiment below in which it was dried over a weekend at 200° C. and 1 mm. Hg.

To the stirred dried Super-Cel was added potassium metal. The mixture was stirred vigorously for about 90 minutes and at about 100° C. Thereafter the dispersed potassium on diatomite catalyst was charged to a 1-liter autoclave along with the desired amount of toluene.

The alkylation of the toluene with propylene was carried out in a 1-liter autoclave equipped with baffles and a turbine stirrer rotating at 600 r.p.m. The mixture was heated and propylene was added until the desired reaction temperature and pressure was reached. The propylene was continuously added to the autoclave at the rate at which it reacted by maintaining a slight pressure difference between a pressure burette to the autoclave.

The amount of reactants used, the reaction conditions, the percent toluene recovered, and the percent conversion to isobutylbenzene are reported below.

Experiment A

Toluene added _____ 36.8 grams.
Propylene charged _____ 588 ml. (of which 413 reacted).
Catalyst _____ 4.88 grams potassium on 15 grams of diatomite.
    Reaction temperature __ 181° C.
    Pressure _____ 410 p.s.i.g.
    Time _____ 180 minutes.
Toluene recovered _____ 21.4 percent.
Isobutylbenzene _____ 66.36 (percent conversion).

Experiment B

| | |
|---|---|
| Toluene added | 368.5 grams. |
| Propylene charged | 584 ml. (of which 407 reacted). |
| Catalyst | 4.88 grams potassium dispersed on 15 grams diatomite. |
| Reaction temperature | 180°. |
| Reaction pressure | 400 p.s.i.g. |
| Time | 180 minutes. |
| Toluene recovered | 23 percent. |
| Isobutylbenzene | 65.59 (percent conversion). |

Experiment C

| | |
|---|---|
| Toluene added | 368.5 grams. |
| Propylene charged | 491 ml. (of which 350 reacted). |
| Catalyst | 4.88 grams potassium dispersed on 15 grams of diatomite carrier. |
| Reaction temperature | 180° C. |
| Reaction pressure | 350 p.s.i.g. |
| Time | 180 minutes. |
| Toluene recovered | 22 percent. |
| Isobutylbenzene | 60.3 (percent conversion). |

Experiment D

| | |
|---|---|
| Toluene added | 368.5 grams. |
| Propylene charged | 577 ml. (of which 404 reacted). |
| Catalyst | 4.88 grams potassium dispersed on 15 grams of diatomite carrier. |
| Reaction temperature | 181° C. |
| Reaction pressure | 400 p.s.i.g. |
| Time | 180 minutes. |
| Toluene recovered | 20 percent. |
| Isobutylbenzene | 62.1 (percent conversion). |

Experiment E

| | |
|---|---|
| Toluene added | 368.5 grams. |
| Propylene charged | 579 ml. (of which 389 reacted). |
| Catalyst | 4.88 grams of potassium on 15 grams of diatomaceous earth support. |
| Reaction temperature | 180° C. |
| Reaction pressure | 400 p.s.i.g. |
| Time | 180 minutes. |
| Toluene recovered | 22 percent. |
| Isobutylbenzene | 60.6 (percent conversion). |

Example XVII

Although the invention has been particularly described in its applicability to aromatic hydrocarbons, it is to be understood that it is also applicable to alkylations of other aromatic systems as well. Thus, it can be used to N-alkylate aniline and other primary and secondary amines wherein an amino group is bonded to an aromatic nucleus. The following preparation of N-isopropyl aniline is an illustration of this.

To an autoclave is charged 372 grams of distilled aniline, 4.88 grams of potassium metal and 15 grams of dried Hyflo Super-Cel which had been pretreated as in previous examples. At a temperature of 42° C., 140 ml. of propylene was added, raising the pressure in the autoclave to 180 p.s.i.g. The temperature within the autoclave was raised to 300° C. over a period of about one hour and 40 minutes. Upon raising that temperature the reaction pressure was 725 p.s.i.g. The temperature was maintained at 300° C. for a period of about one hour and 45 minutes and over that period the pressure decreased to 590 p.s.i.g. The vessel was cooled to room temperature and allowed to stand overnight. The next day 100 ml. of propylene was added and the pressure raised to 300° over a period of two hours and 45 minutes. The temperature was maintained at 300° C. for about five hours. Over that interval the pressure had decreased to 720 p.s.i.g.

The autoclave was cooled and vented to atmospheric pressure. Thereafter isopropanol was added to the autoclave to hydrolyze the potassium. The crude product was discharged and some of the crude product was inadvertently lost during the discharging operation.

After filtering, water-washing, and drying the crude product over magnesium sulfate, the product again was filtered and the magnesium sulfate filtrate washed with 30 grams of toluene. The product was then distilled.

Despite the loss of some of the crude product, 96.7 grams of N-isopropyl aniline was obtained.

In a similar manner, aromatic primary and secondary amines such as those set forth in Closson et al., U.S. Patent 2,750,417, can be alkylated. The pertinent disclosure regarding aromatic amines in Closson et al. is incorporated by reference herein as if fully set forth.

The process of this invention can also be used to alkylate a carbon atom alpha to a nitrogen-containing aromatic nucleus. Such compounds are described in Closson et al., U.S. Patent 2,750,384. The disclosure of the heterocyclic six-membered aromatic rings having one or more nitrogens as a member thereof within said Closson et al. patent is also incorporated by reference here as if fully set forth.

In addition, this invention can be employed to alkylate other aromatic systems such as alkyl substituted ferrocenes and alkyl substituted cyclopentadienyl metal carbonyls.

With regard to the ferrocenes, it is possible to prepare unsymmetrical materials such as isobutylcyclopentadienyl (methylcyclopentadienyl)iron. Such unsymmetrical compounds in general are difficult to prepare.

Example XVIII

The procedures of Examples II–XIII are repeated, using one mole of potassium on diatomite catalyst per each 100 mole portion of toluene. Similar results are obtained. A faster reaction is afforded when five moles of potassium on diatomite are used per each 100 mole portion of toluene.

All the examples above can be carried out substituting sodium on diatomite for the catalyst set forth in the examples. In most instances, a lower yield of reaction product is obtained.

We claim:
1. A process for the alkylation of a hydrogen-bearing saturated carbon atom which is alpha to a benzenoic aromatic nucleus, said process comprising reacting an olefin and an aromatic hydrocarbon in the presence of an unpromoted catalyst,
   (i) said olefin being selected from aliphatic olefins which are solely composed of hydrogen and up to about four carbon atoms, said olefins being characterized by the absence of acetylenic linkages, said olefins also being characterized in that both of the carbon atoms connected by the unsaturated bond are also bonded to at least one hydrogen atom,
   (ii) said aromatic hydrocarbon being selected from benzenoic aromatic compounds which are solely composed of hydrogen and up to about 14 carbon atoms, said compounds being characterized by having a benzenoid nucleus and not more than two aliphatic side chains attached to said nucleus, said side chain and said benzenoid nucleus being linked through a valence bond of the carbon atom alpha to said nucleus, said carbon atom being bonded to at least one hydrogen, said side chain being devoid of unsaturated bonds, said nucleus being selected from phenyl, phenylene, naphthyl and naphthylene,
   (iii) said unpromoted catalyst consisting essentially of an alkali metal dispersed on diatomaceous earth, said alkali metal having an atomic number of from 11 to 19;
said process being conducted at a temperature of from about 100° to about 250° C., at a pressure within the range of from ambient pressure to 400 p.s.i.g., and in the presence of a catalytic quantity of said catalyst.

2. The process of claim 1 wherein said catalyst is potassium dispersed on diatomaceous earth.

3. The process of claim 2 wherein said aromatic hydrocarbon is a xylene.

4. The process of claim 2 wherein said aromatic hydrocarbon is 1,2,3,4-tetrahydronaphthalene.

5. The process of claim 2 wherein said aromatic hydrocarbon is toluene.

6. The process of claim 2 wherein said aromatic hydrocarbon is isopropyl benzene.

7. The process of claim 2 wherein said aromatic hydrocarbon is ethyl benzene.

8. A side-chain alkylation process which comprises reacting a terminal olefin having up to four carbon atoms with an aromatic compound having the moiety

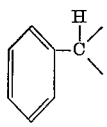

said aromatic compound selected from toluene, xylene, ethylbenzene, isopropylbenzene, mesitylene, n-propylbenzene, and tetralin, said process being conducted at a temperature of from about 100° to about 250° C., a pressure of from about 14.7 to about 400 p.s.i.g., and in the presence of a catalytic quantity of unpromoted catalyst consisting essentially of potassium metal dispersed on diatomaceous earth.

9. The process of claim 8 wherein said diatomaceous earth is treated at a temperature of from 20° to 120° C., at a pressure of 1 to 10 mm. Hg for a period of two to 24 hours prior to dispersal of said potassium thereon.

10. The process of claim 1 wherein said diatomaceous earth is treated at a temperature of from 20° to 120° C., at a pressure of 1 to 10 mm. Hg for a period of two to 24 hours prior to dispersal of said alkali metal thereon.

11. Process for the preparation of n-propyl benzene, said process comprising reacting toluene and ethylene at a temperature of from about 100° to about 250° C., a pressure of from about 14.7 to about 400 p.s.i.g. and in the presence of a catalytic quantity of unpromoted catalyst consisting essentially of potassium metal dispersed on diatomaceous earth.

12. Process for the preparation of isobutylbenzene, said process comprising reacting toluene and propylene at a temperature of from about 100° to about 250° C., a pressure of from about 14.7 to about 400 p.s.i.g. and in the presence of a catalytic quantity of unpromoted catalyst consisting essentially of potassium metal dispersed on diatomaceous earth.

References Cited

UNITED STATES PATENTS 2,721,886  10/1955  Pines et al. _____ 260—668
2,849,508  8/1958   Pines _____ 260—668

DELBERT E. GANTZ, *Primary Examiner.*

CURTIS R. DAVIS, *Assistant Examiner.*

U.S. Cl. X.R.
260—578

PO-1050
(5/69)

UNITED STATES PATENT OFFICE
CERTIFICATE OF CORRECTION

Patent No. 3,449,455     Dated  June 10, 1969

Inventor(s) John P. Napolitano and Rex D. Closson

It is certified that error appears in the above-identified patent and that said Letters Patent are hereby corrected as shown below:

Column 7, line 38, "100° to about 200°C" should read -- 100° to about 220°C --.

SIGNED AND
SEALED

NOV 25 1969

(SEAL)
Attest:

Edward M. Fletcher, Jr.

Attesting Officer

WILLIAM E. SCHUYLER, JR.
Commissioner of Patents